(12) United States Patent
Barnes et al.

(10) Patent No.: US 12,119,993 B2
(45) Date of Patent: Oct. 15, 2024

(54) DYNAMIC NETWORK OF SUPERCOMPUTING RESOURCES WITH UNIFIED MANAGEMENT INTERFACE

(71) Applicant: Advanced Micro Devices, Inc., Santa Clara, CA (US)

(72) Inventors: Jesse Barnes, Sebastopol, CA (US); Max Alt, San Francisco, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 707 days.

(21) Appl. No.: 17/143,111

(22) Filed: Jan. 6, 2021

(65) Prior Publication Data

US 2021/0160138 A1     May 27, 2021

Related U.S. Application Data

(63) Continuation-in-part of application No. 16/185,604, filed on Nov. 9, 2018, now abandoned.

(60) Provisional application No. 62/584,274, filed on Nov. 10, 2017.

(51) Int. Cl.
| | |
|---|---|
| *H04L 41/0823* | (2022.01) |
| *G06F 9/48* | (2006.01) |
| *G06F 9/50* | (2006.01) |
| *H04L 12/46* | (2006.01) |
| *H04L 47/70* | (2022.01) |

(52) U.S. Cl.
CPC ........ *H04L 41/0823* (2013.01); *G06F 9/4843* (2013.01); *G06F 9/5027* (2013.01); *H04L 12/4641* (2013.01); *H04L 47/82* (2013.01); *G06F 2209/505* (2013.01)

(58) Field of Classification Search
CPC ............. G06F 2209/505; G06F 9/4843; G06F 9/5027; H04L 12/4641; H04L 41/0823; H04L 47/82
USPC ....................................................... 709/201
See application file for complete search history.

(56) References Cited

U.S. PATENT DOCUMENTS

| | | | | |
|---|---|---|---|---|
| 10,970,113 | B1* | 4/2021 | Kurtzer | G06F 9/5005 |
| 11,080,096 | B1* | 8/2021 | Fakhouri | G06F 9/5072 |
| 2005/0257079 | A1* | 11/2005 | Arcangeli | G06Q 30/08 |
| | | | | 714/4.4 |
| 2007/0198789 | A1* | 8/2007 | Clark | G06F 11/1458 |
| | | | | 714/E11.122 |
| 2010/0205005 | A1* | 8/2010 | Pritchett | G16H 10/60 |
| | | | | 705/7.19 |

(Continued)

OTHER PUBLICATIONS

Microsoft Computer Dictionary 489 (5th ed. 2002) (Year: 2002).*
Merriam-Webster's Collegiate Dictionary 706, 997 (10th ed. 1993) (Year: 1993).*

*Primary Examiner* — David P Zarka
(74) *Attorney, Agent, or Firm* — Fishman Stewart PLLC

(57) ABSTRACT

Systems, methods, and apparatuses are disclosed for implementation and management of a network of computing clusters and interfaces. In various embodiment, a dynamic supercomputing resource marketplace system can include a cluster network having one or more interconnected computing clusters. The dynamic supercomputing resource marketplace system also can include a user interface system or an application program interface system for enabling a user to access the computing clusters. Advantageously, the dynamic supercomputing resource marketplace system can be used to facilitate increased utilization of computing clusters.

20 Claims, 3 Drawing Sheets

(56) References Cited

U.S. PATENT DOCUMENTS

| | | | |
|---|---|---|---|
| 2014/0257852 A1* | 9/2014 | Walker | G06Q 10/10 |
| | | | 705/3 |
| 2015/0347689 A1* | 12/2015 | Neagle | A61B 5/0836 |
| | | | 705/3 |
| 2017/0097841 A1* | 4/2017 | Chang | H04L 67/10 |
| 2020/0145256 A1* | 5/2020 | Medamana | H04L 67/306 |
| 2021/0090047 A1* | 3/2021 | Tichy | G06Q 20/202 |
| 2021/0117859 A1* | 4/2021 | Rogers | G06N 3/045 |
| 2022/0179715 A1* | 6/2022 | Yegorin | G06F 9/5072 |

* cited by examiner

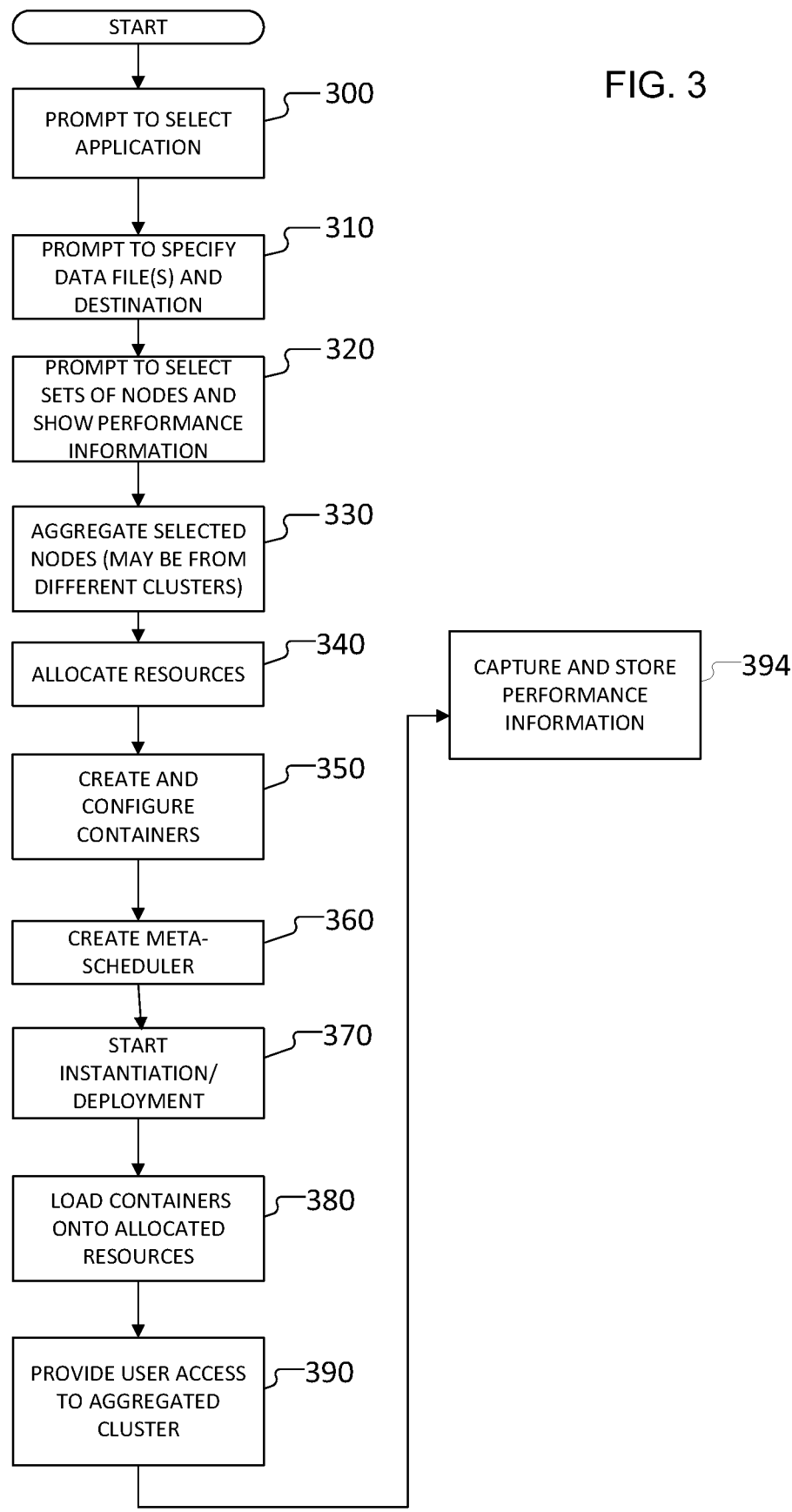

DYNAMIC NETWORK OF SUPERCOMPUTING RESOURCES WITH UNIFIED MANAGEMENT INTERFACE

CROSS-REFERENCE TO RELATED APPLICATIONS

This application claims the benefit of, and priority to, U.S. Provisional Application Ser. No. 62/584,274, filed Nov. 10, 2017, the disclosure of which is hereby incorporated herein by reference in its entirety and for all purposes.

This application is a continuation-in-part of, claims the benefit of, and claims priority to, U.S. application Ser. No. 16/185,604, filed Nov. 9, 2018, the disclosure of which is hereby incorporated herein by reference in its entirety and for all purposes.

TECHNICAL FIELD

This specification relates generally to computer networking, including high performance computing or supercomputing, as well as systems, apparatuses, and methods for making and using the same.

The systems, apparatuses and methods disclosed herein describe particular embodiments such as those including a network of computing clusters and interfaces for facilitating user interaction and are not intended to be exhaustive of the contemplated configurations and processes.

BACKGROUND

As large-scale computing has become more prevalent, more and more scalable applications have been developed and made available. Computing clusters also have grown in size and capability. However, a large number of these clusters are not fully utilized because users only consume available resources part of the time. In addition to cluster underutilization, another issue with conventional large scale computing solutions is that many small and medium sized institutions (e.g., companies, universities, and individual users) do not have access to large scale, purpose-built compute resources. For at least these reasons, there exists a need to allow increased utilization of such clusters and, thereby, increase overall efficiency over the lifetime of each cluster.

SUMMARY

This specification describes new technologies relating to increased computing cluster utilization in large scale computing environments by, among other things, aggregating computing clusters into an easy-to-use network with a unified application programming interface (API) and user interface (UI) for access. For example, according to various embodiments, computing clusters are aggregated and made more easily available, thereby facilitating accelerated development in various fields such as engineering, pharmaceuticals, and bioinformatics.

BRIEF DESCRIPTION OF THE DRAWINGS

FIG. 3 is a flowchart of another example embodiment of a method for processing computing jobs in a distributed computing system marketplace.

Figure 1:
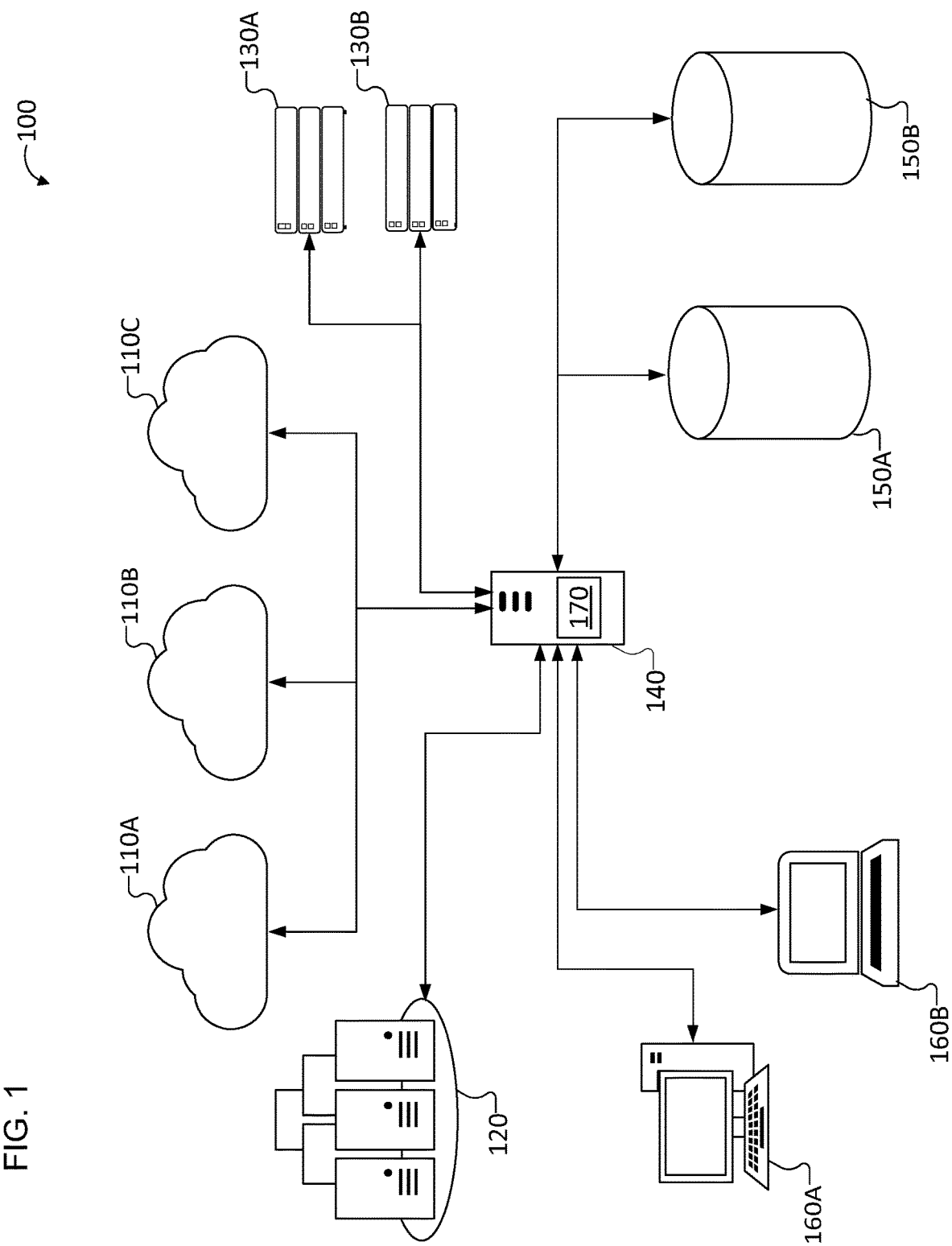
FIG. 1 is an illustration of one example of a distributed computing system and marketplace.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and does not limit the scope of the present disclosure.

DETAILED DESCRIPTION

Systems, apparatuses, and methods are provided for improved high-performance computing through a dynamic supercomputing resource marketplace. According to various embodiments, small and medium sized firms and institutions, such as those that may not have access to the large-scale resources on their own, are among the consumers of resources in the disclosed marketplace. The principles described herein can be used to help such consumers make discoveries or improve designs in ways only previously available to larger entities.

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their on-premises network-connected PCs, workstations, or servers (160A) and laptop or mobile devices (160B) via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with a one or more virtual CPUs may be offered in standard configurations with predetermined amounts of accompanying memory and storage.

In addition to cloud computing providers 110A, 110B, and 110C, management server 140 may also be configured to communicate with bare metal computing devices 130A and 130B (e.g., non-virtualized servers), as well as multiple datacenters 120 each including for example one or more high performance computing (HPC) systems such as supercomputers (e.g., each having multiple nodes organized into clusters, with each node having multiple processors and memory), and storage systems 150A and 150B. Bare metal computing devices 130A and 130B may for example include workstations, servers, or supercomputers optimized for compute-inventive tasks such as machine learning computations and scientific simulations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C #, or Rust. The program code may execute entirely on the server 140, partly on server 140 and partly on other computing devices in distributed computing system 100.

The management application 170 provides an interface to users (e.g., via a web application, portal, API server or command line interface) that permits users and administrators to submit applications/jobs via their workstations 160A, laptops 160B, and mobile devices, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, or one or more nodes within a cluster. Management server 140 may be configured with one or more processors, volatile memory, and non-volatile memory such as flash storage or internal or external hard disk (e.g., network attached storage accessible to server 140).

Management application 170 may also be configured to receive computing jobs from user devices 160A and 160B, determine which of the distributed computing system 100 computing resources are available to complete those jobs, make recommendations on which available resources best meet the user's requirements, allocate resources to each job, and then bind and dispatch the job to those allocated resources. In one embodiment, the jobs may be applications operating within containers (e.g. Kubernetes with Docker containers or the Singularity container platform developed at Lawrence Berkeley National Lab specifically for HPC workloads) or virtualized machines.

Unlike prior systems, management application 170 may be configured to provide users with information about the predicted relative performance of different configurations in clouds 110A-C and bare metal systems in data center 120 and systems 130A-B. These predictions may be based on information about the specific application the user is planning to execute. In some embodiments the management application 170 may make recommendations for which configurations (e.g., number of processors, amount of memory, amount of storage) best match a known configuration from the user or which bare metal configurations best match a particular cloud configuration.

Figure 2:
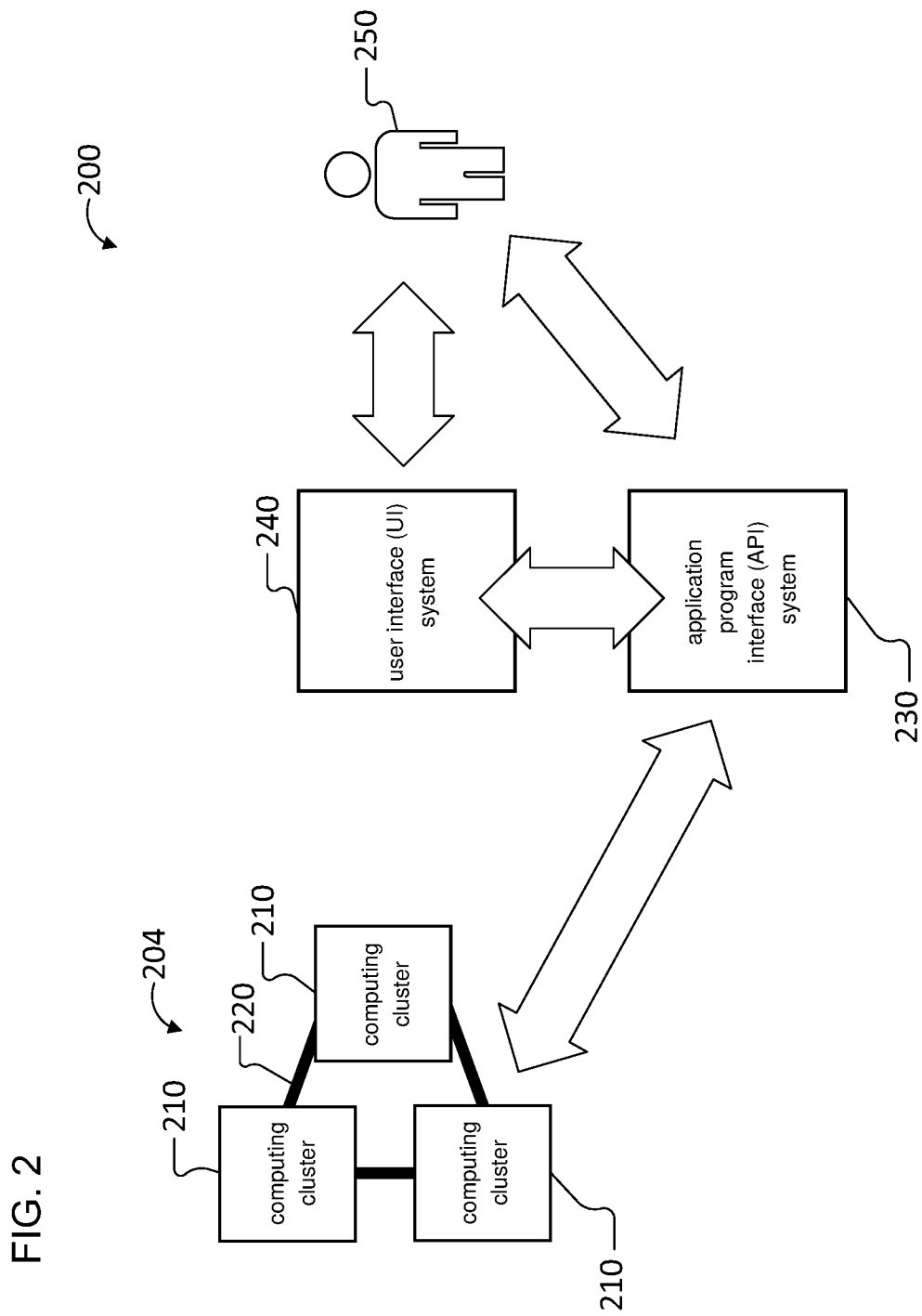
FIG. 2 is a system diagram of an exemplary embodiment of a dynamic supercomputing resource marketplace system.

Turning to FIG. 2, an exemplary embodiment of a dynamic supercomputing resource marketplace system 200 (e.g., implemented in management application 170) is shown. The dynamic supercomputing resource marketplace system 200 is shown as including a cluster network 204 having one or more interconnected computing clusters 210. The cluster network 204 can include any predetermined number of computing clusters 210, and the computing clusters 210 can be configured to communicate via one or more network communication connections 220. In the embodiment shown in FIG. 2, a selected computing cluster 210 can communicate with one or more other computing clusters 210 in the cluster network 204 via a respective network communication connection 220.

Advantageously, various benefits discussed herein (and other benefits) can be made possible, for example, by the creation of portable containers for applications and a container meta-scheduler with support for submitting jobs to multiple clusters running different resource management software. In some embodiments, a job may be submitted to multiple nodes in multiple clusters running different resource management software (e.g., an HPC cluster using Slurm Resource Manager, and a public cloud provider using Torque Resource Manager). This may be done concurrently within of a single aggregated computing cluster comprising multiple nodes in multiple physical clusters running different resource management software. This may also be done concurrently to multiple different aggregated computing clusters, wherein each separate aggregated computing cluster comprises multiple nodes from one or more different physical clusters, some of which may be running different resource management software. For example, when sufficient resources are not available on one cluster, or when the performance of different systems needs to be rapidly compared, the application may be containerized and that are instantiated on multiple different clusters concurrently. In some embodiments, the management application may automatically create the correct meta-scheduler instances for the user's specified application based on the resource management software used by the different computing resources they select, thereby simplifying the execution of the user's application across multiple different clusters. Similarly, other container-specific configurations may also be performed automatically as well based on the specific configuration and attributes of the selected nodes that will be allocated.

According to various embodiments, one or more selected computing clusters 210 (or, alternatively, each computing cluster 210 in the cluster network 204 can include an installed supported container system. A supported container system, for example, can comprise Singularity or any other open-source container system software, without limitation.

Additionally, and/or alternatively, the selected computing clusters 210 (or, alternatively, each computing cluster 210) in the cluster network 204 can include a supported resource management system. Exemplary resource management system can include, but are not limited to, SLURM Workload Manager available from SchedNdD LLC, headquartered in Lehi, Utah, PBS Professional software (or PBSpro) available from Altair Engineering Inc., headquartered in Troy, Michigan and/or Univa GridEngine available from Univa Corporation, headquartered in Lisle, Illinois. In some embodiments, users 250 can have an option to use prepackaged containers that support running on the various computing clusters 210 in the cluster network 204 and/or using their own proprietary containers. The proprietary containers preferably comply with any applicable containerization guidelines to ensure portability across different computing clusters 210 in the cluster network 204.

FIG. 2 shows that the dynamic supercomputing resource marketplace system 200 can include a user interface (or UI) system 240 and/or an application program interface (API) system 230. The user interface system 240 can provide one or more user interface services, and/or the application program interface system 230 can provide one or more API services. In selected embodiments, the user interface services and/or the API services can be hosted publicly and/or privately. If hosted privately, for example, a private network (not shown) can generally be available to those users 250 who are located within a selected institution (or company) and/or to those users 250 who are permitted by an owner of the hosting service. According to various embodiments, for example, this feature is used to streamline usage of a selected number of computing clusters 210 within a single institution with an option to include one or more partners on an as-needed basis.

Turning to FIG. 3, a flow chart of one embodiment of a method for method for increasing computing cluster utilization in large scale computing environments is shown. As in the example above, the large-scale computing environment may be non-homogeneous not just with respect to the number of CPUs, GPUs, memory, storage, and interconnects, but also with respect to the resource management software used.

In this example embodiment, the user may be prompted (e.g., via a web interface presented either privately or publicly) to select an application to execute (step 300). This may for example include selecting from a list of applications that have been previously configured for the marketplace, a list of the user's prior executed applications, or a new application. The user may then be prompted to specify one or more data files and output destinations for the application (step 310). The user may be prompted to select the sets of nodes from the available clusters on which to execute the user's specified application (step 320). Based on the specified application and data files selected, a performance estimate (e.g., projected run time and/or projected cost) may be presented to the user. This estimate may be based on performance data captured from earlier executions of the application, earlier executions of similar applications or benchmarks, from a short test run performed by the system, or based on pre-specified performance data such as floating-point operations per second (FLOPS) or instructions per second (IPS). The user may also be asked to confirm their selection in light of the performance estimate.

The selected nodes may be aggregated (step 330) and allocated (step 340). As noted above, the nodes may be from a single cluster, multiple homogenous clusters, or different heterogenous clusters (e.g., with different configurations and different resource management software). Containers or virtual machines may be created and configured for the application, e.g., master and worker containers (step 350), as well as meta scheduler to coordinate between the different resource management software (step 360). Instantiation/deployment to the allocated resources may be performed (step 370), including loading containers (step 380) and configuration such as setting up networking connections (e.g., VPN/SSH connections between master and worker nodes). Once configured, access may be provided to the user (step 390). In some embodiments, performance tools may be automatically included as part of the configuration (step 394) and resulting performance data may be gathered.

Various benefits of a networking environment are disclosed herein. Although various implementations are described and illustrated in the present disclosure, the principles described herein are not limited to such. For example, while particular scenarios are referenced, the principles described herein can apply to any suitable environment.

While processes, systems, and methods may be described herein in connection with one or more steps in a particular sequence, it should be understood that such methods may be practiced with the steps in a different order, with certain steps performed simultaneously, with additional steps, and/or or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

Accordingly, although particular embodiments are described and illustrated herein, the principles described herein can be applied to different types of networking solutions. Certain embodiments have been described for the purpose of simplifying the description and for illustrative purposes only. It will also be understood that reference to a "container" or other hardware or software terms herein can refer to any other type of suitable device, component, software, and so on. Moreover, the principles discussed herein can be generalized to any number and configuration of devices and protocols and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of the present disclosure.

What is claimed is:

1. A method for increasing computing cluster utilization in large scale computing environments, the method comprising:
    aggregating a plurality of interconnected computing clusters into a cluster network, wherein different subsets of the plurality of interconnected computing clusters use different resource management software;
    providing a user access to the aggregated computing clusters via a unified application programming interface (API) that provides (i) a single interface to the plurality of interconnected computing clusters and the different resource management software, and (ii) a user interface for providing one or more user interface services;
    creating a plurality of portable containers for one or more applications and executing the plurality of portable containers via a plurality of selected computing clusters in the cluster network; and
    wherein the aggregated computing clusters form a dynamic supercomputing resource marketplace system.

2. The method of claim 1, wherein the plurality of interconnected computing clusters comprise multiple different public clouds and one or more private computing clusters connected via one or more virtual private networks (VPNs) that are automatically configured for the user.

3. The method of claim 2, further comprising presenting the user with controls for selecting (i) an application to be executed and (ii) a set of nodes to be used to execute the application, wherein the set of nodes are selected from the aggregated computing clusters.

4. The method of claim 3, wherein creating the plurality of containers includes one or more containers for the application to be executed and executing a container meta-scheduler configured to schedule containerized jobs across the selected set of nodes, wherein the container meta-scheduler communicates with the different resource management software for the selected set of nodes.

5. The method of claim 4, further comprising calculating and presenting to the user an estimated cost and an estimated execution time for the selected application on the selected set of nodes.

6. The method of claim 4, further comprising calculating an estimated cost to execute an application selected by the user.

7. The method of claim 1, wherein the plurality of portable containers include master and worker containers configured for a selected application.

8. The method of claim 1, wherein the plurality of portable containers are executed via each of the computing clusters in the cluster network.

9. The method of claim 1, further comprising scheduling jobs for a selected application on nodes of the aggregated computing clusters.

10. The method of claim 9, wherein said scheduling jobs for the selected application includes supporting submission of jobs to several of the plurality of selected computing clusters.

11. The method of claim 10, wherein said supporting submission of jobs includes configuring each of the plurality of selected computing clusters to include a resource management system.

12. The method of claim 11, wherein said configuring each of the plurality of selected computing clusters comprises configuring each of the plurality of selected computing clusters to include a different resource management system.

13. The method of claim 1, further comprising enabling at least one of the computing clusters to support a pre-packaged container.

14. The method of claim 1, further comprising enabling at least one of the computing clusters to support a proprietary container that is associated with one or more users.

15. The method of claim 14, wherein the proprietary container complies with preselected containerization guidelines for ensuring portability across different computing clusters in the cluster network.

16. A computer program product for increasing computing cluster utilization in large scale computing environments, the computer program product comprising:
    one or more non-transitory machine-readable storage media;
    instruction for aggregating a plurality of interconnected computing clusters into a cluster network;
    instruction for accessing the aggregated computing clusters, said instruction for accessing the aggregated computing clusters including at least one of (i) instruction for accessing the aggregated computing clusters via a unified application programming interface (API) for providing one or more API interface services and (ii) instruction for accessing the aggregated computing clusters via a user interface for providing one or more user interface services;
    instruction for creating a plurality of portable containers for one or more applications and executing the plurality of portable containers via a plurality of selected computing clusters in the cluster network;
    wherein the aggregated computing clusters form a dynamic supercomputing resource marketplace system; and
    wherein at least one of (i) the one or more API interface services and (ii) the one or more user interface services are hosted publicly.

17. A method for increasing computing cluster utilization in large scale computing environments, the method comprising:
    forming a dynamic marketplace with supercomputing resources acquirable by a user to execute a computing job via aggregating a plurality of interconnected computing clusters into a cluster network;
    providing the user access to the aggregated computing clusters via a unified application programming interface (API) that provides (i) a single interface to the plurality of interconnected computing clusters and the different resource management software, and (ii) a user interface for providing one or more user interface services;
    wherein different subsets of the plurality of interconnected computing clusters use different resource management software;

presenting the user with controls for selecting (i) an application to be executed and (ii) a set of nodes to be used to execute the application, wherein the set of nodes are selected from the aggregated computing clusters; and calculating and presenting to the user an estimated cost and an estimated execution time to execute the selected application on the selected set of nodes.

18. The method of claim 17, further comprising creating a portable container and executing the portable container via a selected computing cluster in the cluster network.

19. The method of claim 17, further comprising creating a plurality of containers for the application to be executed and executing a container meta-scheduler configured to schedule containerized jobs across the selected set of nodes, wherein the container meta-scheduler communicates with the different resource management software for the selected set of nodes.

20. A method for increasing computing cluster utilization in large scale computing environments, the method comprising:

aggregating a plurality of interconnected computing clusters into a cluster network, wherein different subsets of the plurality of interconnected computing clusters use different resource management software;

providing a user access to the aggregated computing clusters via a unified application programming interface (API) that provides (i) a single interface to the plurality of interconnected computing clusters and the different resource management software, and (ii) a user interface for providing one or more user interface services;

wherein the aggregated computing clusters form a dynamic supercomputing resource marketplace system;

wherein the plurality of interconnected computing clusters comprise multiple different public clouds and one or more private computing clusters connected via one or more virtual private networks (VPNs) that are automatically configured for the user; and further including presenting the user with controls for selecting (i) an application to be executed and (ii) a set of nodes to be used to execute the application, wherein the set of nodes are selected from the aggregated computing clusters.

* * * * *